US012801882B2

United States Patent

Lee et al.

(12) United States Patent
(10) Patent No.: US 12,801,882 B2
(45) Date of Patent: Nov. 17, 2026

(54) POWER SUPPLY FILM, AND USER FINGERPRINT REGISTRATION METHOD OF FINGERPRINT RECOGNITION CARD USING THE POWER SUPPLY FILM

(71) Applicant: E-TUNNEL INC, Seoul (KR)

(72) Inventors: Sang Joon Lee, Chungcheongnam-do (KR); Dong Su Kim, Gyeonggi-do (KR); Yung Kug Kim, Seoul (KR)

(73) Assignee: E-TUNNEL INC, Seoul (KR)

( * ) Notice: Subject to any disclaimer, the term of this patent is extended or adjusted under 35 U.S.C. 154(b) by 329 days.

(21) Appl. No.: 18/684,256

(22) PCT Filed: Dec. 22, 2023

(86) PCT No.: PCT/KR2023/021469
§ 371 (c)(1),
(2) Date: Feb. 16, 2024

(87) PCT Pub. No.: WO2025/070897
PCT Pub. Date: Apr. 3, 2025

(65) Prior Publication Data
US 2026/0141205 A1 May 21, 2026

(30) Foreign Application Priority Data
Sep. 27, 2023 (KR) ........................ 10-2023-0130076

(51) Int. Cl.
*G06K 19/07* (2006.01)
*G06V 10/75* (2022.01)
(Continued)

(52) U.S. Cl.
CPC ............. *G06K 19/07* (2013.01); *G06V 40/12* (2022.01)

(58) Field of Classification Search
CPC .... G06K 19/07; G06K 7/0013; G06K 7/0017; G06K 7/0021; G06K 7/0034; G06K 19/005; G06K 19/07798; G06K 19/07345; H01M 6/40; H01M 10/0436; H01M 50/109; H01M 4/625; H01M 50/197; H01M 2004/028; G06V 40/12
See application file for complete search history.

(56) References Cited

U.S. PATENT DOCUMENTS 6,906,436 B2 * 6/2005 Jenson .................... H01M 6/40
429/162
7,334,735 B1 * 2/2008 Antebi ............... G06K 19/0728
235/492
(Continued)

FOREIGN PATENT DOCUMENTS

WO WO-2004025545 A2 * 3/2004 ............. G07C 9/257

OTHER PUBLICATIONS

Unleashing The Wild Card for Mobile Payment (Year: 2014).*

*Primary Examiner* — Thien T Mai
(74) *Attorney, Agent, or Firm* — The PL Law Group, PLLC

(57) ABSTRACT

A power supply film attached to a fingerprint recognition card and configured to supply power to the fingerprint recognition card, wherein the power supply film includes a paper battery configured to supply power, and a current sensor configured to be activated when the power supply film is attached to the fingerprint recognition card so that the power of the paper battery is supplied.

10 Claims, 6 Drawing Sheets

(51) Int. Cl.
*G06V 40/12* (2022.01)
*G06V 40/50* (2022.01)

(56) References Cited

U.S. PATENT DOCUMENTS

| | | | | |
|---|---|---|---|---|
| 2005/0118464 | A1* | 6/2005 | Levanon ........... | H01M 10/4257 429/185 |
| 2022/0045532 | A1* | 2/2022 | Onuki ................... | H01M 10/44 |

* cited by examiner

POWER SUPPLY FILM, AND USER FINGERPRINT REGISTRATION METHOD OF FINGERPRINT RECOGNITION CARD USING THE POWER SUPPLY FILM

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/KR2023/021469 filed on Dec. 22, 2023, which claims priority to the benefit of Korean Patent Application No. 10-2023-0130076 filed Sep. 27, 2023 in the Korean Intellectual Property Office, the entire contents of which are incorporated herein by reference.

BACKGROUND

1 Technical Field

The present application relates to a power supply film, and user fingerprint registration method of fingerprint recognition card using the power supply film.

2. Background Art

In general, a fingerprint recognition card is a card that is provided with a fingerprint recognition sensor and registers a user's fingerprint for use.

However, the power required to store and register a user fingerprint in the fingerprint recognition card is not provided by the fingerprint recognition card itself, so fingerprint information may be received through a card reader.

Recently, a type of a fingerprint recognition card has been developed with a built-in battery to provide the power required for fingerprint recognition and registration. However, when the battery is embedded in the fingerprint recognition card, there may be issues such as malfunctions or deformations due to the lifespan of the battery during long-term use, which can compromise the durability of the fingerprint recognition card.

SUMMARY

In general, a personal computer (PC), a program for registration, and a registration terminal are required to register a user fingerprint at a fingerprint recognition card. The present disclosure is directed to providing a power supply film and a user fingerprint registration method of a fingerprint recognition card using the power supply film, wherein the power required for user fingerprint registration at the fingerprint recognition card is received by attaching the power supply film for single use and registration is processed without such equipment.

Hereinafter, embodiments of the present disclosure will be described in detail with reference to the accompanying drawings. However, the technical idea of the present disclosure is not limited to the embodiments to be described and may be implemented in various forms. At least one of the elements between the embodiments may be selectively combined and/or replaced within the scope of the technical idea of the present disclosure.

According to an embodiment of the present disclosure, in order to perform a fingerprint registration method of a fingerprint recognition card according to the present disclosure, a fingerprint recognition card 100 and a power supply film 200 may be included. The power supply film 200 is attached to supply power to the fingerprint recognition card 100.

Herein, the power supply film 200 attached to the fingerprint recognition card 100 may be provided in the form of a sticker. Thus, after the power supply film 200 is attached to the fingerprint recognition card 100 and a user fingerprint registration procedure is completed, the power supply film 200 may be detached back and removed from the fingerprint recognition card 100.

A protective film may be provided on a surface of the power supply film 200. When the protective film is detached, the adhesive ingredients are exposed and the power supply film 200 is detachably attached to the fingerprint recognition card 100.

In other words, the power supply film 200 is for single use, and is attached to the fingerprint recognition card 100 to supply power required for fingerprint registration and removed when fingerprint registration is completed.

The fingerprint recognition card 100 and the power supply film 200 may be provided with respective contact terminals so that the power of the power supply film 200 is provided to the fingerprint recognition card 100. The respective contact terminals may be connected to an IC card connector 130 and an IC connector 240 that are provided at the fingerprint recognition card 100 and the power supply film 200, respectively.

The power supply film 200 may include a paper battery 210, a current sensor 220, a central processing unit (CPU) 230, and the IC connector 240.

The paper battery 210 may refer to a battery that is thin and flexible like paper, rather than a battery made of paper.

The paper battery 210 supplies power to the CPU 230 to enable operation.

Herein, the current sensor 220 prevents the continuous supply of power to the CPU 230 from the paper battery 210, thereby avoiding the consumption of unnecessary current in a standby state. When the power supply film 200 is attached to the fingerprint recognition card 100, an output signal generated when the current sensor 220 is activated enables the power to be supplied from the paper battery 210 to the CPU 230.

The current sensor 220 may produce an output signal ranging from 0 V to a working voltage (3.3 V, 5 V). When no current flows, the output signal is at 0 V. When current flows, the output signal is at the working voltage.

The current sensor 220 may include a shunt resistor and a non-inverting amplifier (op-amp).

When the power supply film 200 is attached to the fingerprint recognition card 100, the current sensor 220 is activated and a signal is output. Using the signal, the power of the paper battery 210 is supplied to the CPU 230, and the CPU 230 enters an operable state.

When the power supply film 200 is attached to the fingerprint recognition card 100, the current sensor 220 senses current caused by the paper battery 210 and the CPU 230 operates and performs control such that the power of the paper battery 210 is supplied to the fingerprint recognition card 100.

The fingerprint recognition card 100 transmits and receives data to and from the wireless terminal 300 capable of wireless communication as a terminal. The fingerprint recognition card 100 may include an antenna 110, a controller 120, the IC card connector 130, a power management part p 140, a biometric information recognition sensor 150, a security CPU 160, a security chip 170, and a memory 180. The antenna 110 enables wireless power (AC power) to be supplied from the wireless terminal 300. The IC card connector 130 transmits and receives data to and from the wired terminal 400 and receives DC power from the wired terminal 400.

When the fingerprint recognition card 100 performs user fingerprint registration through the wireless power supplied from the wireless terminal 300, the wireless power is supplied in the form of impulses at intervals, so the wireless power is not continuously supplied and it may be difficult to use the wireless power as the power required for fingerprint registration.

Therefore, when the fingerprint recognition card 100 according to the present disclosure receives power by wire rather than by wireless, the power may be used as the power required for fingerprint registration. However, when wireless power is received, the wireless power is insufficient. In order to solve this problem, according to the present disclosure, the power supply film 200, which is separately provided, is attached so that the power required for fingerprint registration is supplied.

The wireless terminal 300 may include a near-field communication (NFC) or RFID terminal (including a reader).

The controller 120 enables data to be received by wireless and wireless power to be supplied from the wireless terminal 300 through the antenna 110. The supplied wireless power may be transmitted to the power management part 140.

The IC card connector 130 enables data to be transmitted to and received from and DC power to be supplied by wire from the wired terminal 400, which functions a terminal. Herein, when the fingerprint recognition card 100 is inserted into and connected to a socket, the socket is connected to the wired terminal 400 by wire and receives DC power to transmit the DC power to the power management part 140 and data is transmitted to the controller 120.

The power management part 140 may perform power control that converts AC power, which is the wireless power input by the controller 120, to DC power, and determines the optimal power source among input power sources to supply the power to the biometric information recognition sensor 150, the security CPU 160, and the security chip 170.

The biometric information recognition sensor 150 may sense and obtain biometric information, such as user fingerprints.

When power is supplied through the antenna 110 or the IC card connector 130, the security CPU 160 obtains a user biometric information image from the biometric information recognition sensor 150 and compares the user biometric information image with a fingerprint template pre-stored and registered in the memory 180 to determine whether the user biometric information image and the fingerprint template match.

When a result of comparison shows that the user biometric information image and the fingerprint template match, the security CPU 160 activates the security chip 170. The security chip 170 encrypts card identification number (CID) information, which is data in the memory 180 and is a card security code, and may transmit the encrypted CID information to the wireless terminal 300 or the wired terminal 400.

In addition, the card security code may be a card number when the fingerprint recognition card 100 is a credit card.

Then, the wireless terminal 300 or the wired terminal 400 may approve payment or open the door lock of a door depending on the functions of the terminal.

The memory 180 may store biometric information obtained from the biometric information recognition sensor 150 or various recognition devices.

The fingerprint recognition card 100 may be provided with an LED lamp 102 for indicating an operating state.

In addition, a single or a plurality of LED lamps 102 may be provided. When a plurality of LED lamps 102 are provided, the LED lamps 102 are on and off and display different colors by being divided to indicate different operating state situations.

The fingerprint recognition card 100 receives a unique identification value generation command from the wireless terminal 300 or the wired terminal 400 and generates a unique identification value corresponding to the recognized fingerprint. The unique identification value may be encrypted and stored. The generated unique identification value may be stored in the memory 180.

A user fingerprint registration method of the fingerprint recognition card 100 using the power supply film 200 according to the embodiment of the present disclosure is as follows.

The user fingerprint registration method of the fingerprint recognition card according to the embodiment of the present disclosure may include: removing the protective film of the power supply film 200 in a first step S10;

after the first step, attaching the power supply film 200 to a surface of the fingerprint recognition card 100 so that the power of the paper battery 210 inside the power supply film 200 is supplied to the fingerprint recognition card 100 in a second step S20;

after the second step, supplying the power to the CPU 230 inside the power supply film 200 in a third step S30;

after the third step, transmitting, by the CPU 230, a command signal for user fingerprint registration by the fingerprint recognition card 100 to the security CPU 160 of the fingerprint recognition card 100 in a fourth step S40;

after the fourth step, extracting, by the security CPU 160, a user fingerprint template when a user fingerprint is input to the fingerprint recognition sensor 150 of the fingerprint recognition card 100 in a fifth step S50;

after the fifth step, storing the fingerprint template in the memory 180 inside the fingerprint recognition card 100 in a sixth step S60;

after the sixth step, removing the power supply film 200 from the fingerprint recognition card 100 in a seventh step S70.

In the second step S20, the contact terminal formed at the power supply film 200 touches the card contact terminal formed at the fingerprint recognition card 100 and the IC connector 240 of the power supply film 200 is connected to the IC card connector 130 of the fingerprint recognition card 100.

In addition, in performing the second step S20, when the IC connector 240 of the power supply film 200 is connected to the IC card connector 130 of the fingerprint recognition card 100, the current sensor 220 inside the power supply film 200 allows the power of the paper battery 210 inside the power supply film 200 to be supplied to the CPU 230.

In addition, in performing the fifth step S50, fingerprint information may be input multiple times through the fingerprint recognition sensor 150 of the fingerprint recognition card 100. Herein, throughout the multiple times, each time fingerprint information is input, the LED lamp 102 is on and off for notification.

In addition, when normal fingerprint template extraction is completed and encryption and storage are completed, the LED lamp 102 is on and off to indicate that the fingerprint template extraction operation is completed. Herein, the LED lamp 102 may be on and off in a different color from the color when the LED lamp 102 is on and off to indicate that the fingerprint information is input.

The power supply film 200 may be detached from the fingerprint recognition card 100 and discarded. Therefore, the power supply film 200 may be used for single use.

In the user fingerprint registration method of the fingerprint recognition card 100 using the power supply film 200 according to the embodiment of the present disclosure, when the power supply film 200 is separately provided and fingerprint registration is performed, the power supply film 200 is attached to the fingerprint recognition card 100 to provide the power required for fingerprint registration.

Thus, a battery may not be embedded in the fingerprint recognition card 100 using the power supply film 200 according to the embodiment of the present disclosure.

A method of storing and registering the user fingerprint information in the memory 180 of the fingerprint recognition card 100 according to the present disclosure may be performed as follows.

In the related art, when user fingerprint information is registered in the memory 180, a computer and a card reader for fingerprint registration may be required.

The computer may have a related program installed that may store fingerprint information in the memory 180 of the fingerprint recognition card 100 of the present disclosure.

The card reader may be connected to the computer by wire, and the fingerprint recognition card 100 may be inserted to transmit and receive data.

Therefore, when the computer executes the related program to register fingerprint information, the related program attempts to recognize fingerprint information of a user multiple times (for example, 8 to 12 times) in different directions through the fingerprint recognition sensor 150 of the fingerprint recognition card 100, and the recognized and obtained fingerprint information is stored in the memory 180 to be used as a fingerprint template.

However, according to the present disclosure, user fingerprint information is easily registered through the fingerprint recognition card 100 and the power supply film 200 without the computer and the card reader.

In this way, a user's unique biometric information, a fingerprint, may be pre-stored in the fingerprint recognition card 100. When necessary, the fingerprint recognition card may be used as a payment approval means by being linked with various terminals, or may be used as an approval means when various doors are controlled.

For example, when the fingerprint recognition card is used as an approval means for door control, an access authentication system using fingerprint recognition is generally configured as follows. A fingerprint recognition device 500 is provided on one side of a door. First, a user fingerprint is registered. When the door is used, a user touches a fingerprint recognition part 510 on his or her finger so that the fingerprint recognition device 500 attempts to recognize the fingerprint. When the recognized fingerprint and the registered fingerprint information match, the user is approved to use the door.

The present disclosure may approve access to the door by linking the fingerprint recognition device 500 with the fingerprint recognition card 100 without using a server in which fingerprint information is stored to manage the fingerprint information.

The Fingerprint information, which is the user's own biometric information, is stored in the fingerprint recognition card 100. Therefore, when the user touches the fingerprint recognition device on his or her finger for an attempt to recognize the fingerprint, the recognized fingerprint information is temporarily transmitted to the fingerprint recognition card 100. Herein, when the fingerprint recognition card 100 is in contact with (or inserted into) the fingerprint recognition device 500, comparison to the fingerprint template, which is the biometric information stored inside the fingerprint recognition card 100, is performed to determine whether the recognized fingerprint information and the fingerprint template match.

In other words, a user fingerprint template is pre-stored in the fingerprint recognition card 100, so the fingerprint recognition card 100 may serve as a separate server when the fingerprint recognition device 500 is used.

When the fingerprint recognition card 100 according to the embodiment of the present disclosure receives a fingerprint image obtained by recognizing the fingerprint information, which is the recognized biometric information, from the fingerprint recognition part 510 of the fingerprint recognition device 500, the security CPU 160 performs comparison to the fingerprint template stored in the memory 180.

Accordingly, as a result of comparison, when the received fingerprint image and the stored fingerprint template match, the security chip 170 transmit a match result information data to the fingerprint recognition device. The fingerprint recognition device 500 gives a door lock device 600 a command to open or close the door and approves access to open the door.

As another example may be card bill payment using fingerprint information.

In the case of being used as a card for paying various bills, while the fingerprint recognition card 100 of the present disclosure is connected to a card terminal, a user touches the fingerprint recognition sensor 150 provided in the fingerprint recognition card 100 on his or her finger for an attempt to recognize the fingerprint. Then, the fingerprint information is recognized and the security CPU 160 provided inside the fingerprint recognition card 100 compares the recognized fingerprint information to the fingerprint template stored in the memory 180. When the recognized fingerprint information and the fingerprint template match, the security chip 170 transmits a card security code to the card terminal so that the payment approval procedure is performed.

The present disclosure has been described as being applied to a fingerprint recognition card that registers user fingerprint information, but without being limited thereto, is also applicable to a card in which another type of biometric information, such as finger veins, face, or iris, is stored.

Next, a fingerprint recognition card according to a second and a third embodiment of the present disclosure will be described in more detail. Conventional biometric authentication has a problem that biometric information of a biometric authentication customer is stored in a server, which is a particular storage means of a biometric authentication service provider, on a network or in a memory of a recognition device. In the related art, if a storage means is stolen or hacked by an external intruder, users' unique information is leaked, causing significant loss to the users.

In the related art, if biometric information used for authentication for various closing and opening devices and electronic commerce is leaked to the outside, all the closing and opening devices and electronic commerce systems using the fingerprint information wrongly authenticate an illegal user using the leaked fingerprint information as a normal user, thus causing enormous damage to users who widely use the biometric information, for example.

The fingerprint recognition card according to the present disclosure is a biometric information authentication card (used interchangeably with the term "fingerprint recognition card" in the present disclosure) that stores biometric information in the card which is a storage medium the user can carry, and that enables authentication through communication with a terminal.

Accordingly, unlike the related art, it is unnecessary to store and use biometric information in an external storage means, that is, a server, thus fundamentally solving problems such as Server theft and hacking.

The biometric information authentication card according to the present disclosure may receive the power for performing the authentication procedure from the power management part when connected to a wireless or wired terminal, and may perform authentication, without storing a separate internal battery. The problem of change in quality of or damage to a battery provided inside a biometric information authentication card due to long-term use can be fundamentally solved. Accordingly, the biometric information authentication card according to the present disclosure can be used without any problems despite long-term use.

FIG. 8 shows a second embodiment in which a terminal performs an authentication procedure.

The elements provided inside a biometric information authentication card 10 may include a communication module (an NFC module, etc.) 11, a power management part 12, a first memory 13 and a second memory 14, which are memories, a security CPU 15, and a security chip 16. The communication module 11 is for communicating with a terminal 20.

The communication module 11 may include an antenna for near-field communication (NFC), and a controller for controlling a communication state.

The power management part 12 may receive wireless power from the terminal 20 and may perform control for the operation of each of the elements (the security CPU 15, the security chip 16, etc.) of the biometric information authentication card 10.

In addition, the first memory 13 M1 may pre-store biometric information of the user (owner) of the biometric information authentication card 10. The second memory 14 (M2) may receive and store new biometric information.

Authentication may be performed including: making a biometric information authentication card touch or reach a terminal in a first step; receiving terminal information from the terminal by a biometric information authentication card in a second step; transmitting a biometric information template stored in the biometric information authentication card to the terminal in a third step; obtaining new biometric information through a biometric information recognition part of the terminal in a fourth step; and performing an authentication procedure by the terminal according to the terminal information in a fifth step.

FIG. 9 shows a third embodiment in which an authentication procedure is performed in a biometric information authentication card.

Authentication may be performed including: obtaining new biometric information of a user through a biometric information recognition part of a terminal in a first step; making a biometric information authentication card touch or reach the terminal in a second step; temporarily storing the new biometric information obtained from the terminal in the biometric information authentication card according to terminal information received by the biometric information authentication card in a third step; performing an authentication procedure in which the new biometric information temporarily stored in the biometric information authentication card is compared to reference biometric information stored in the biometric information authentication card to determine whether the new biometric information and the reference biometric information match, in a fourth step; and transmitting authentication result data to the terminal for temporary storage, and performing, by the terminal, a procedure according to an authentication result in a fifth step.

In the meantime, as described above, an embodiment in which the fingerprint recognition sensor 150 is embedded in the fingerprint recognition card 100 is also possible. When the fingerprint recognition card 100 is equipped with the fingerprint recognition sensor 150, new biometric information is received through the fingerprint recognition sensor 150 and compared to reference biometric information prestored in the fingerprint recognition card 100 to determine whether the new biometric information and the reference biometric information match. An authentication procedure is performed, and authentication result data is transmitted to a terminal to perform an approval procedure.

In particular, when the fingerprint recognition card 100 receives wireless power through a wireless terminal and uses the wireless power, the power required to store and register user biometric information, for example, fingerprint information, may be insufficient.

When the user fingerprint information is recognized through the fingerprint recognition sensor 150 embedded in the fingerprint recognition card 100, the power may be received through the above-described power supply film 200 as a separate power supply means.

As described above, the present disclosure relates to the single-use power supply film equipped with the paper battery. When the power supply film is attached and connected to the fingerprint recognition card in registering a user fingerprint at the fingerprint recognition card, the power of the paper battery can be supplied to the fingerprint recognition card and can be used as the power for user fingerprint registration through the fingerprint recognition sensor on the fingerprint recognition card.

In addition, according to the present disclosure, when user fingerprint registration at the fingerprint recognition card is completed, the attached power supply film can be detached and removed.

According to the present disclosure, the single-use power supply film is configured in a sticker type and is attached to the fingerprint recognition card so as to provide the power required to register a user fingerprint in the memory in the fingerprint recognition card. Instead, a separate battery is not embedded in the fingerprint recognition card, so the fingerprint recognition card can be used semi-permanently.

Accordingly, the fingerprint recognition card to which a user fingerprint is registered using the fingerprint registration method according to the embodiment of the present disclosure can be used as a door control means or as various authentication means for card bill payment.

DETAILED DESCRIPTION

Figure 1:
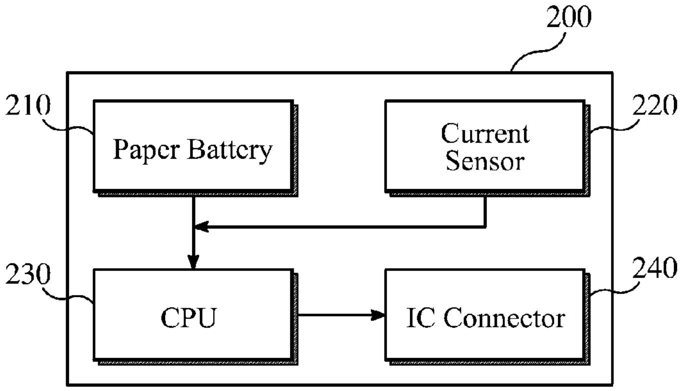
FIG. 1 is a configuration diagram illustrating a power supply film attached to a fingerprint recognition card according to an embodiment of the present disclosure.
Figure 2:
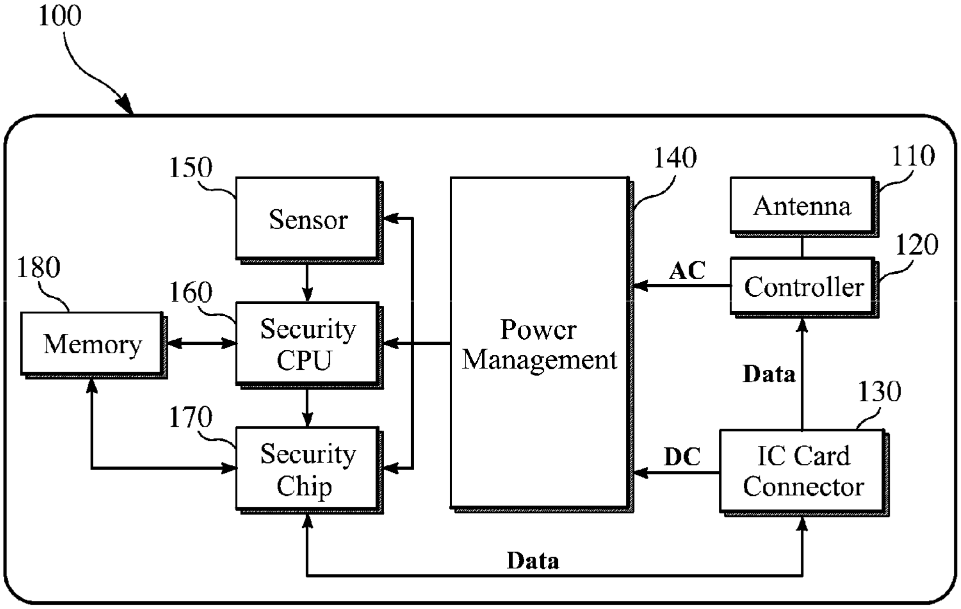
FIG. 2 is a configuration diagram illustrating the fingerprint recognition card according to the embodiment of the present disclosure.
Figure 3:
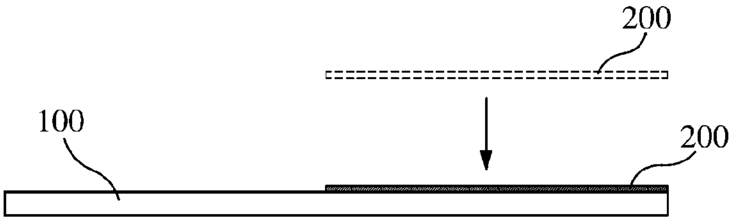
FIG. 3 is a side view illustrating a state in which the power supply film is attached to the fingerprint recognition card according to the embodiment of the present disclosure.
Figure 4:
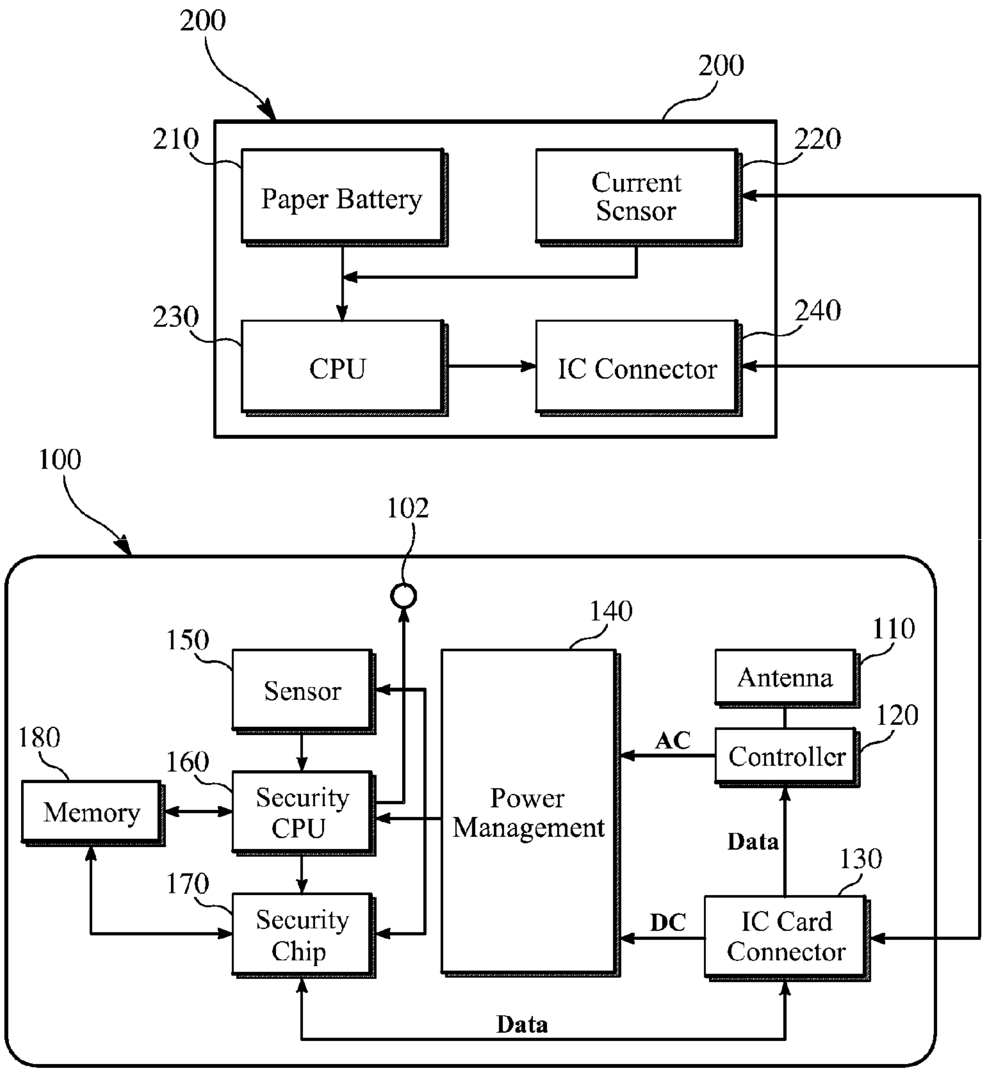
FIG. 4 is a configuration diagram illustrating a power supply flow state according to a configuration of the power supply film and the fingerprint recognition card according to the embodiment of the present disclosure.
Figure 5:
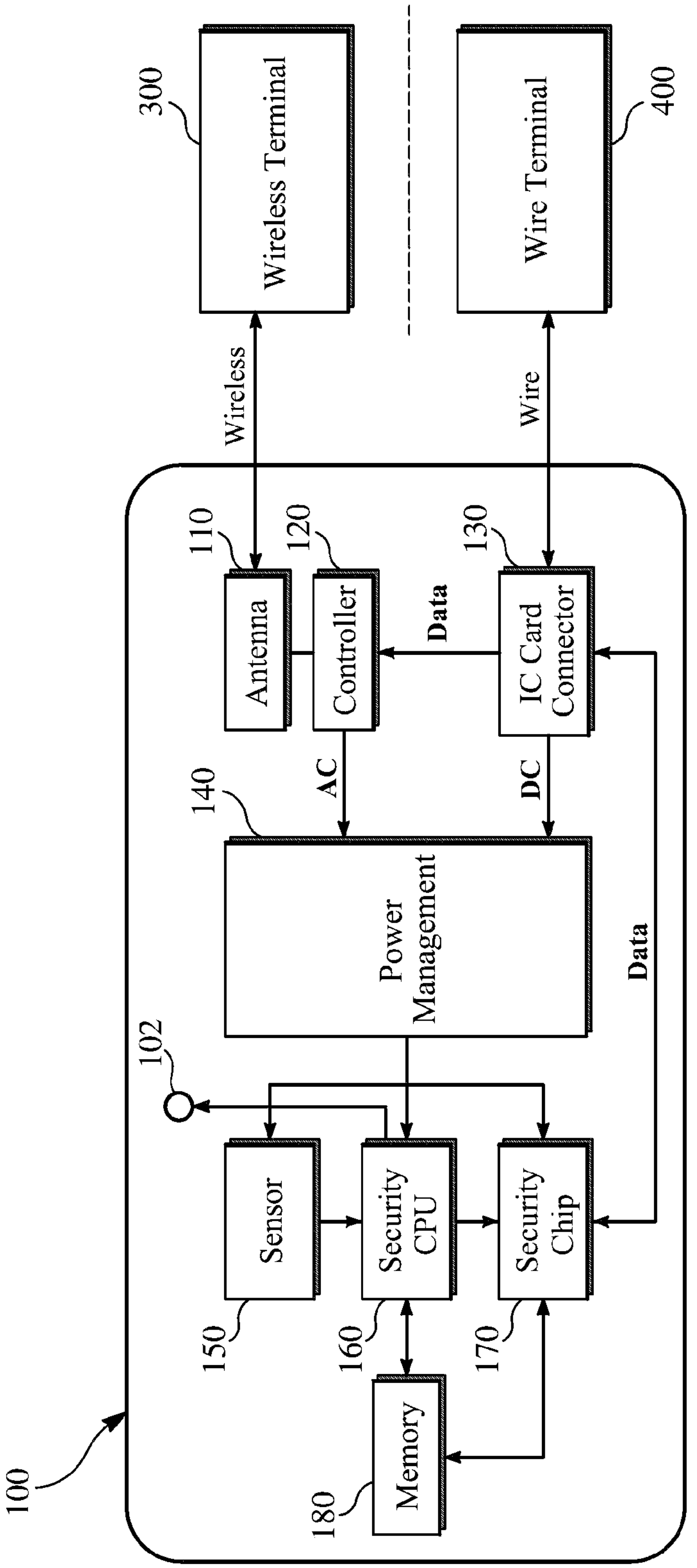
FIG. 5 is a configuration diagram illustrating a connection state between a wireless terminal or a wired terminal and the fingerprint recognition card according to the embodiment of the present disclosure.
Figure 6:
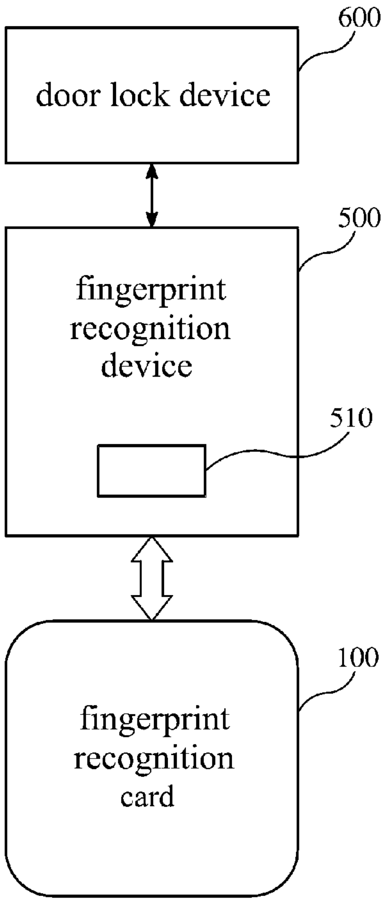
FIG. 6 is a diagram illustrating an example of using the fingerprint recognition card according to the embodiment of the present disclosure, for a door lock device provided with a fingerprint recognition device.
Figure 7:
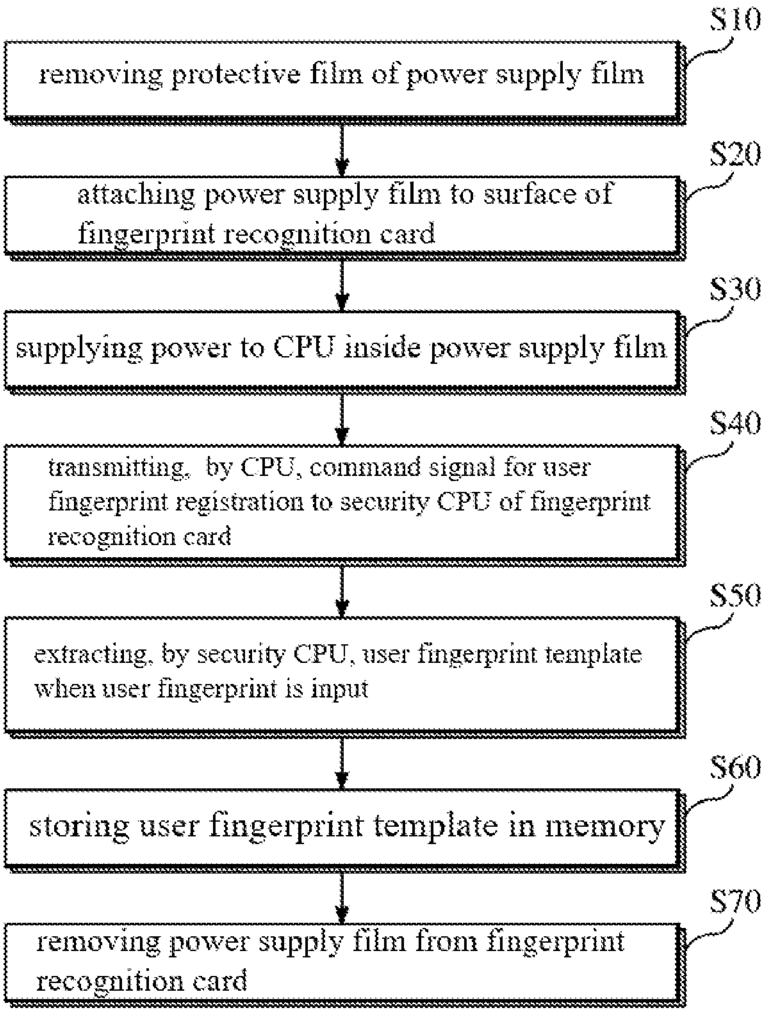
FIG. 7 is a flowchart illustrating a user fingerprint registration method of the fingerprint recognition card using the power supply film according to the embodiment of the present disclosure.
Figure 8:
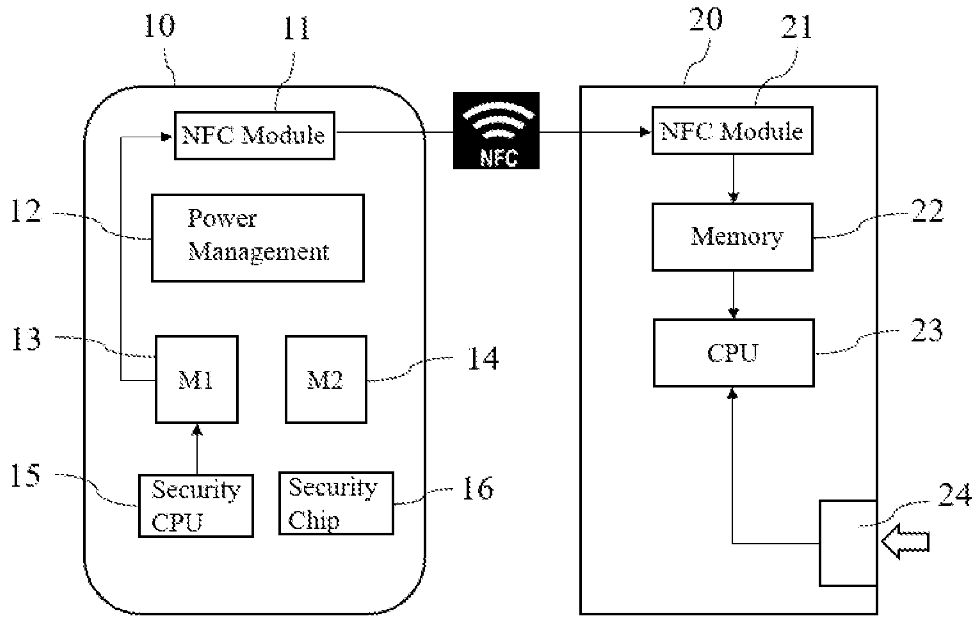
FIG. 8 is a diagram illustrating a fingerprint recognition card according to a second embodiment of the present disclosure.
Figure 9:
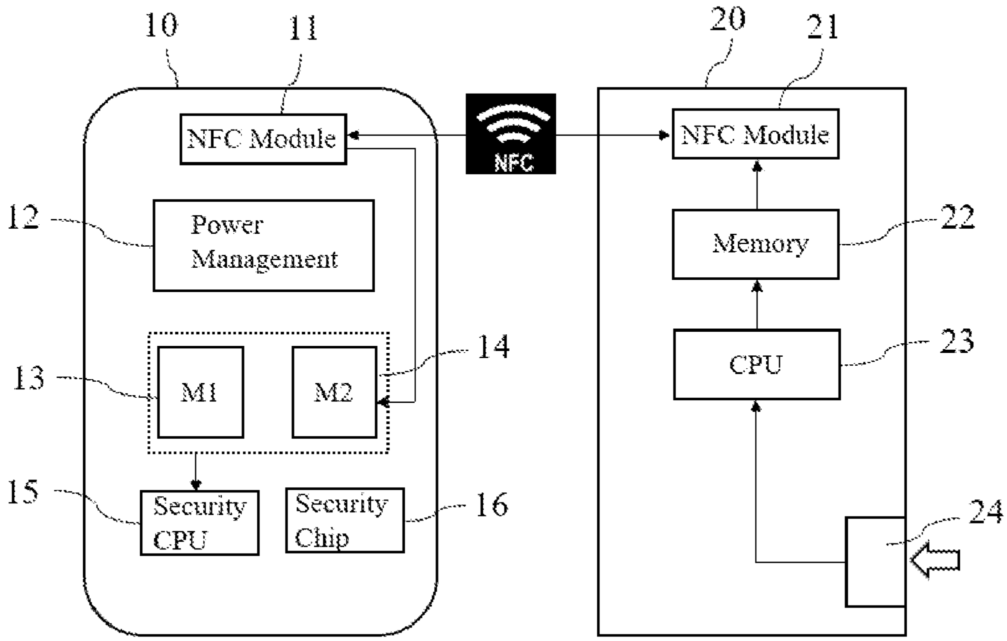
FIG. 9 is a diagram illustrating a fingerprint recognition card according to a third embodiment of the present disclosure.

The present disclosure relates to a power supply film attached to a fingerprint recognition card and configured to supply power to the fingerprint recognition card. The power supply film may include: a paper battery configured to supply power; and a current sensor configured to be activated when the power supply film is attached to the fingerprint recognition card so that the power of the paper battery is supplied.

The power supply film may further include: a CPU configured to receive the power from the paper battery through a signal resulting from activation of the current sensor, and configured to perform control so that the power is supplied to the fingerprint recognition card; and an IC connector configured to be connected to the fingerprint recognition card so that the CPU transmits a command signal for user fingerprint template registration to the fingerprint recognition card.

In addition, the present disclosure relates to a user fingerprint registration method of a fingerprint recognition card, the method including: removing, in a first step, a protective film of a power supply film; attaching, in a second step after the first step, the power supply film to a surface of the fingerprint recognition card so that power of a paper battery inside the power supply film is supplied to the fingerprint recognition card; supplying, in a third step after the second step, the power to a CPU inside the power supply film; transmitting, by the CPU in a fourth step after the third step, a command signal for user fingerprint registration by the fingerprint recognition card to a security CPU of the fingerprint recognition card; extracting, by the security CPU inside the fingerprint recognition card in a fifth step after the fourth step, a user fingerprint template when a user fingerprint is input to a fingerprint recognition sensor of the fingerprint recognition card; storing, in a sixth step after the fifth step, the fingerprint template in a memory inside the fingerprint recognition card; and removing, in a seventh step after the sixth step, the power supply film from the fingerprint recognition card.

What is claimed is:

1. A power supply film attached to a fingerprint recognition card and configured to supply power to the fingerprint recognition card, the power supply film comprising:

a paper battery configured to supply power-;

a current sensor configured to be activated when the power supply film is attached to the fingerprint recognition card so that the power of the paper battery is supplied;

a central processing unit (CPU) configured to receive the power from the paper battery through an output signal resulting from activation of the current sensor, and configured to perform control so that the power is supplied to the fingerprint recognition card; and an integrated circuit (IC) connector configured to be connected to the fingerprint recognition card so that the CPU transmits a command signal for user fingerprint template registration to the fingerprint recognition card.

2. The power supply film of claim 1, wherein the power supply film is attached to supply the power to the fingerprint recognition card, and removed from the fingerprint recognition card when the fingerprint recognition card completes user fingerprint registration.

3. The power supply film of claim 1, wherein the current sensor is configured to allow the power of the paper battery to be supplied to the CPU through a signal resulting from activation of the current sensor when the power supply film is connected to the fingerprint recognition card by attachment.

4. The power supply film of claim 1, wherein the current sensor is configured to remain deactivated to prevent power consumption when the power supply film is in a standby state of not being attached to the fingerprint recognition card, so that the power of the paper battery is not supplied to the CPU.

5. The power supply film of claim 1, wherein a protective film is provided on one surface of the power supply film, and when the power is supplied to the fingerprint recognition card for user fingerprint registration, the protective film is removed and the power supply film is attached to the fingerprint recognition card.

6. A user fingerprint registration method of a fingerprint recognition card, the user fingerprint registration method comprising:

removing, in a first step, a protective film of a power supply film;

attaching, in a second step after the first step, the power supply film to a surface of the fingerprint recognition card so that power of a paper battery inside the power supply film is supplied to the fingerprint recognition card;

supplying, in a third step after the second step, the power to a CPU inside the power supply film;

transmitting, by the CPU in a fourth step after the third step, a command signal for user fingerprint registration by the fingerprint recognition card to a security CPU of the fingerprint recognition card; and extracting, by the security CPU inside the fingerprint recognition card in a fifth step after the fourth step, a user fingerprint template when a user fingerprint is input to a fingerprint recognition sensor of the fingerprint recognition card.

7. The user fingerprint registration method of claim 6, further comprising:

storing, in a sixth step after the fifth step, the fingerprint template in a memory inside the fingerprint recognition card; and removing, in a seventh step after the sixth step, the power supply film from the fingerprint recognition card.

8. The user fingerprint registration method of claim 6, wherein in the second step, a contact terminal provided at the power supply film touches a card contact terminal provided at the fingerprint recognition card and an IC connector of the power supply film is connected to an IC card connector of the fingerprint recognition card.

9. The user fingerprint registration method of claim 6, wherein in the second step, when an IC connector of the power supply film is connected to an IC card connector of the fingerprint recognition card, a current sensor inside the power supply film allows the power of the paper battery inside the power supply film to be supplied to the CPU.

10. The user fingerprint registration method of claim 6, wherein in the fifth step, fingerprint information is input multiple times through the fingerprint recognition sensor of the fingerprint recognition card.

* * * * *